Nov. 24, 1970 D. DAVIDOFF 3,542,933

FRESNEL IMAGE GENERATOR

Filed Aug. 13, 1965 10 Sheets-Sheet 1

INVENTOR.
DORSEY DAVIDOFF
BY
Laurence S. Epstein
ATTORNEYS

INVENTOR.
DORSEY DAVIDOFF
BY
Laurence S Epstein
ATTORNEYS

Nov. 24, 1970 D. DAVIDOFF 3,542,933

FRESNEL IMAGE GENERATOR

Filed Aug. 13, 1965 10 Sheets-Sheet 3

INVENTOR.
DORSEY DAVIDOFF

BY

Laurence S. Epstein
ATTORNEYS

Nov. 24, 1970 D. DAVIDOFF 3,542,933

FRESNEL IMAGE GENERATOR

Filed Aug. 13, 1965 10 Sheets-Sheet 4

INVENTOR.
DORSEY DAVIDOFF

BY

Laurence S. Epstein
ATTORNEYS

INVENTOR.
DORSEY DAVIDOFF
BY
Lawrence S. Epstein
ATTORNEYS

INVENTOR.
DORSEY DAVIDOFF
BY
Laurence S. Epstein
ATTORNEYS

INVENTOR.
DORSEY DAVIDOFF

BY

Laurence S. Epstein
ATTORNEYS

FRESNEL IMAGE GENERATOR

INVENTOR.
DORSEY DAVIDOFF
BY
Laurence S. Epstein
ATTORNEYS

INVENTOR.
DORSEY DAVIDOFF

BY

Laurence S. Epstein
ATTORNEYS

INVENTOR.
DORSEY DAVIDOFF
BY
Laurence S. Epstein
ATTORNEYS

United States Patent Office 3,542,933

Patented Nov. 24, 1970

3,542,933
FRESNEL IMAGE GENERATOR

Dorsey Davidoff, Fort Lee, N.J., assignor, by mesne assignments, to the United States of America as represented by the Secretary of the Navy Filed Aug. 13, 1965, Ser. No. 479,673
Int. Cl. G09b 9/08
U.S. Cl. 35—10.2 2 Claims

ABSTRACT OF THE DISCLOSURE

Apparatus for synthesizing a CRT (cathode ray tube) presentation simulating the appearance of a Fresnel type landing approach device and comprising red and green color wheel means for producing a red, green and amber presentation, signal generating means for positioning the CRT beam at positions simulative of the various approach device lights, oscillator clock, count-down binary means, gate means for gating various signals to the display, blanking means, oscillator hold-off circuit, and asymmetrical one shot multivibrators, all in combination to provide non-uniform time slot insertions of the various signals in the CRT display This invention relates generally to image synthesizing devices and more particularly to a device for generating and combining a plurality of synthesized signals representative of basic aircraft flight parameters so as to drive a system which spot scans a color transparency of a simulated carrier or airfield for training purposes.

Landing of a high speed aircraft on the deck of a moving aircraft carrier of the *Forrestal* class or on a typical naval airfield is a difficult and complex operation requiring a high degree of pilot skill.

A great many pilot landing aids have been developed to ease the difficulties and alleviate the dangers involved. One of the most effective is a sensitive optical system employing Fresnel lenses. The system furnishes a visual aid to an incoming pilot to establish the proper glide angle for an aircraft carrier landing. It is primarily an electro-optical system installed along the flight deck of the aircraft carrier to provide a horizontal bar of light, and a high intensity spot of light. This vertical relationship indicates the glide path angle to the pilot of an approaching landing aircraft.

A horizontal bar of light, formed by the combined action of a set of source lights, Fresnel lenses, and lenticular lenses, is seen in the aperture of the Fresnel lens assembly mounted on the edge of a field or carrier deck, by the incoming pilot, as he brings his aircraft down toward the flight deck for a landing. The relative vertical position of this bar of light as indicated by its alignment with the horizontal, indicates to the pilot whether he is above, below, or on the ideal glide path.

Obviously, proper utilization of the Fresnel lens optical landing system by pilots will be effective in providing a greater degree of reliability in aircraft landing procedures.

The most common form of training for student pilots is the ground flight trainer employing a television display projection unit, and control console, and an image generator. Training is imparted by the illusion of motion created by the display itself, by the conditions imposed or injected by the instructor during a problem, and by the student control. The display is caused to change in response to the simulated speed, course, pitch, roll, and altitude of the simulator to create a visual sensation of motion. Due to the resolution limitations of the TV system a separate projector must be provided for the Fresnel image of much higher resolution. A Fresnel image is synthesized utilizing electron beam positioning rather than TV scanning techniques. A Fresnel computer fully described in co-pending application, Ser. No. 479,674, filed Aug. 13, 1965, properly positions the Fresnel image to coincide with the carrier presentation.

It is, therefore, a prime object of the present invention to provide an adaptor unit whereby a synthetic Fresnel optical signal may be presented on a flight simulating trainer.

It is another object of the present invention to provide a Fresnel beam simulator whereby a realistic display of Fresnel landing lights is presented.

It is a further object of this invention to provide a synthesizing for generating a complete Fresnel image including wave-off and cut lights.

It is still a further object of this invention to provide a unique circuital arrangement for synthesizing signals representative of a complete Fresnel image.

Another object of the present invention is to provide a device which is capable of generating complex waveforms containing analog and or digital information within a series of time slots of equal or unequal lengths.

Other objects and many of the attendant advantages of this invention will be readily appreciated as the same becomes better understood by reference to the following detailed description when considered in connection with the accompanying drawings wherein:

FIG. 1 discloses the face of a typical array of Fresnel lights as would be seen by a landing pilot;

FIGS. 8*a*–8*f* illustrate various waveforms of the device.

Figure 1:
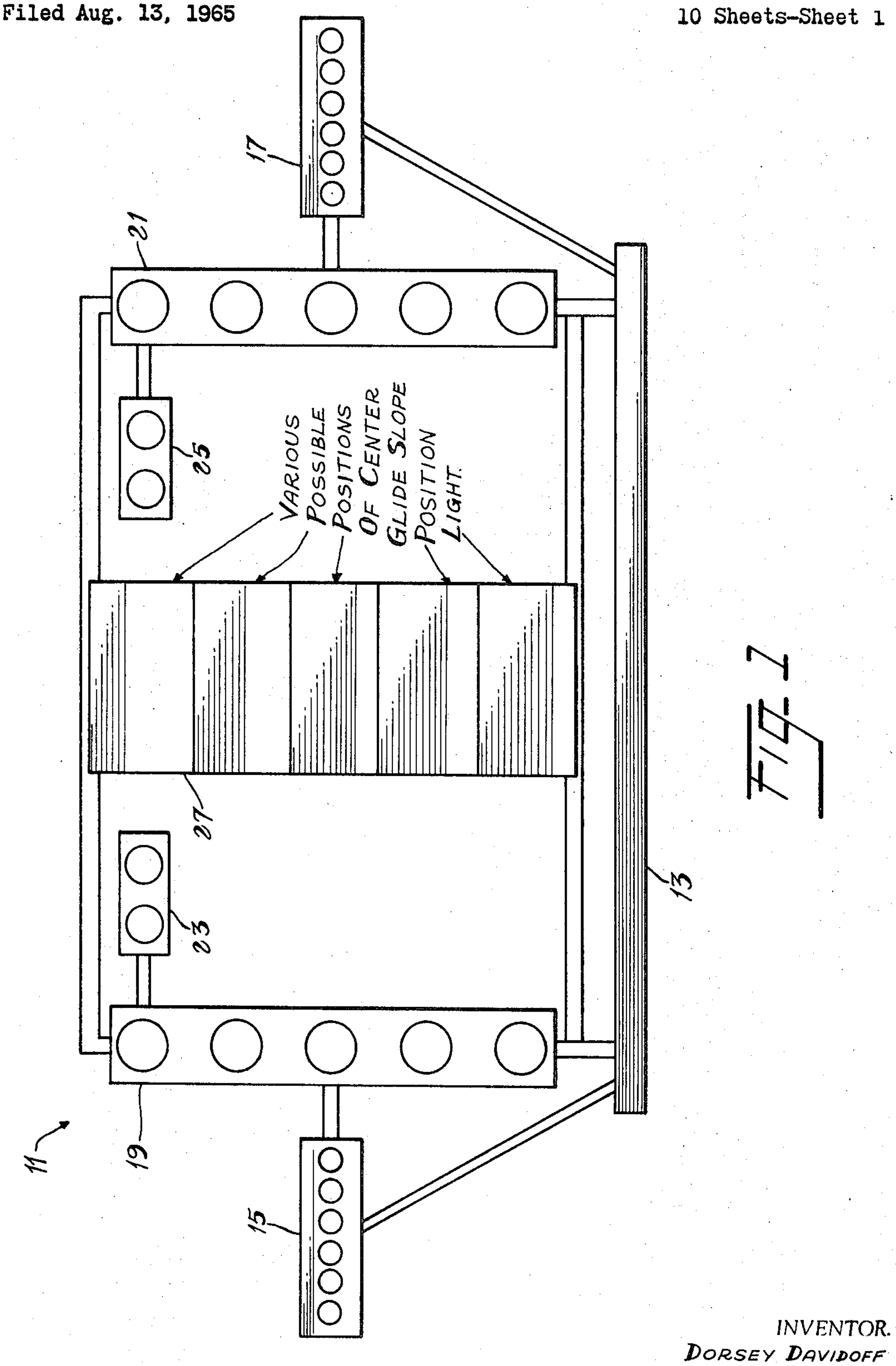

In operational Fresnel systems, the Fresnel light assembly is mounted at the edge of a landing field or carrier deck runway. Referring to FIG. 1, a typical Fresnel lighting assembly 11, is shown mounted on a support boom 13. The assembly consists of a left Datum set 15, a right Datum light set 17, a left outboard wave-off light set 19, a right outboard wave-off light set 21, a left cut light set 23, a right cut light set 25, and a vertical glide path indicator light set 27. The Datum and cut lights are usually green, the outboard wave-off lights are usually red, and the glide path indicator lights are usually amber. The Datum light sources 15, and 17, form a horizontal line. The position of light 27, with respect to 15, and 17, is indicative of the vertical glide path position of the aircraft with respect to its proper position.

In operation, the relative vertical position of the lighted bar on vertical glide path indicator unit 27, as indicated by its alignment with the horizontal Datum light sources 15 and 17, indicates to the pilot whether he is above, below, or on the ideal path. The Datum lights and the glide angle lights are illuminated continuously whenever the deck edge assembly is in operation. The wave-off lights 19 and 21 flash 180° out of phase with the Datum and glide angle lights, and signify an incorrect landing approach. The cut lights 23 and 25 are used to signal pilots of propeller driven aircraft when to cut power to their engines. The wave-off lights are not operated while the cut lights are on, since this would be an improper signal.

To create a realistic presentation, the image of a carrier deck or similar landing field is artificially generated and projected onto a screen. Superimposed on the same screen is a separately generated Fresnel image, synthesized in color to appear approximately like that disclosed in FIG. 1. The generation, positioning, and display of the Fresnel optical landing system lights are accomplished in synchronism with the signals generated by the landing field projector unit 18.

Figure 2:
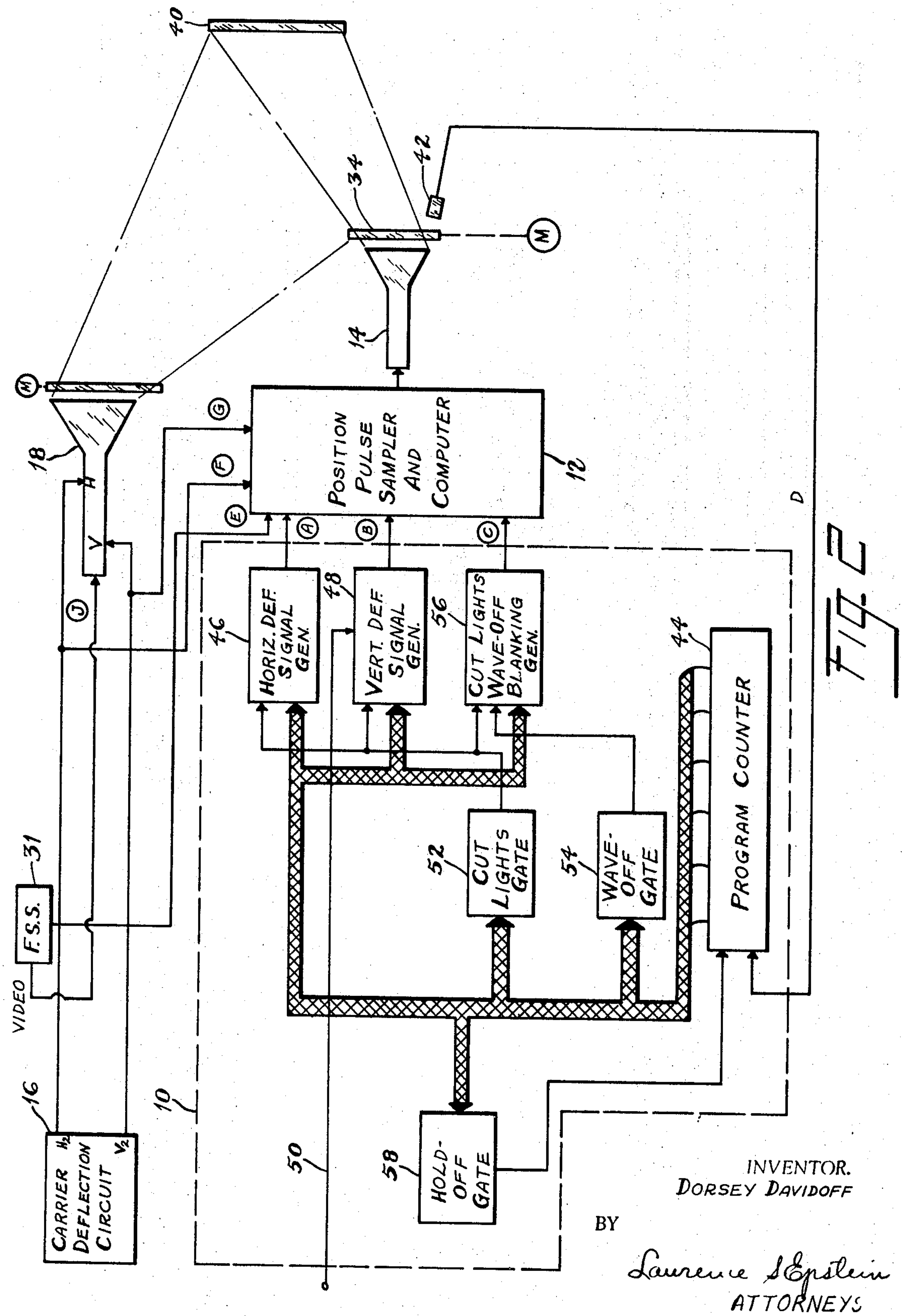
FIG. 2 is a system schematic of the Fresnel optical display system.

Referring to FIG. 2, the Fresnel optical landing system lights are provided by the Fresnel synthesizer 10, the Fresnel computer 12 and the Fresnel projector unit 14. The Fresnel synthesizer 10 generates an image of the Fresnel system by a direct cathode ray tube spot writing technique. It operates in conjunction with a red-green color wheel 34 on the Fresnel projector to generate the red, green and amber colors in the image. The synthesizer is part of a system whereby the image is generated and controlled in size, brightness and focus, and positioned to its proper location on the screen in synchronism with the television display of the carrier. The Fresnel computer unit 12 controls the size, position, brightness and focus of the Fresnel image as projected by the Fresnel projector unit 14. A more detailed description of the Fresnel computing unit 12 is the subject of co-pending application, Ser. No. 479,674, filed Aug. 13, 1965, and is discussed fully therein. Additionally, said co-pending application describes the Flying Spot Scanner 31, and associated circuits and their connections to the synthesizer.

The present invention relates particularly to the Fresnel synthesizing unit 10. Signals representative of the carrier or landing area display are fed to carried projector 18. The carrier image and the Fresnel image are superimposed by appropriate projection devices onto screen 40. The synthesizer 10, produces a complete Fresnel image each time the motor driven color wheel 34 makes one revolution. A small piece of magnetic tape cemented near the center of the wheel produces a pulse in a magnetic pick-up 42 a short interval after the start of the green field. This pulse is thereupon fed to the synthesizing unit 10 to start the image sequence cycle.

As stated above, the Fresnel image utilizes a series of variously colored lights. To stimulate this effect, the rotating color wheel 34 has thereon a green field and a red field. Since the color wheel is placed near the lens, which is the aperture of the optical system, a time occurs when part of the light is passing through the red and part through the green parts of the color wheel. This has the effect of producing an amber color on the screen.

The receipt of the start pulse from the beginning of the green field initiates a program, at counter 44. The counter 44 has 32 stable states and is programmed to count through its first 16 states during the green field. During the interval between the green and the red field an interlock prevents further counting while a further pulse is fed from the counter to trigger a one shot multivibrator which generates the amber glide path signal light. During the red field, counter continues to count until it reaches the 32nd position at which time the sequence is completed and the synthesizer waits until the receipt of another start pulse. The main Fresnel indication, that of glide path, is represented by the horizontal bar of green light as a reference with respect to the amber light position which is generated during the period between the green and red fields. Program counter signals are continuously routed during the cycle to horizontal deflection signal generator unit 46 and vertical deflection signal generator unit 48, where they are developed into signals representative of a set of source lights such as would exist on an operational Fresnel unit such as described in FIG. 1. Since the vertical position of the amber light is representative of the proper glide path angle, a simulating vertical positioning signal may be introduced by proper biasing of signal line 50 which controls the vertical level of this light in vertical deflection signal generator unit 48. Along with the amber glide path indicator and a green horizontal bar of reference light developed on the Fresnel projector 14, a secondary set of lights in both green and red colors may similarly be generated to represent other important information to be given the pilot during a difficult landing. These lights represent four green cut lights which signifies when the pilot is to cut or stop the engines of propeller planes and a red wave-off light signifying an incorrect approach requiring the pilot to recircle the field or carrier and attempt a second landing. A gating unit 52 is provided under the control of the program counter and the instructor, for signifying the proper instant during the color wheel cycle for utilization of the cut lights while a further gating unit 54 is provided for similarly signifying wave-off lights. A further generator 56 operates in conjunction with said gates to generate the proper pulses, for the computer 30. The 32nd pulse of the program counter is a waiting period. Hold-off gate 58 prevents the program counter 44 from running during the waiting period before the arrival of a start pulse and also during the 16th and 17th interval. The 16th is a delay interval which times the start of a signal along positioning line 50 and the 17th interval is the actual pulse proceeding along input line 50.

Figure 3A:
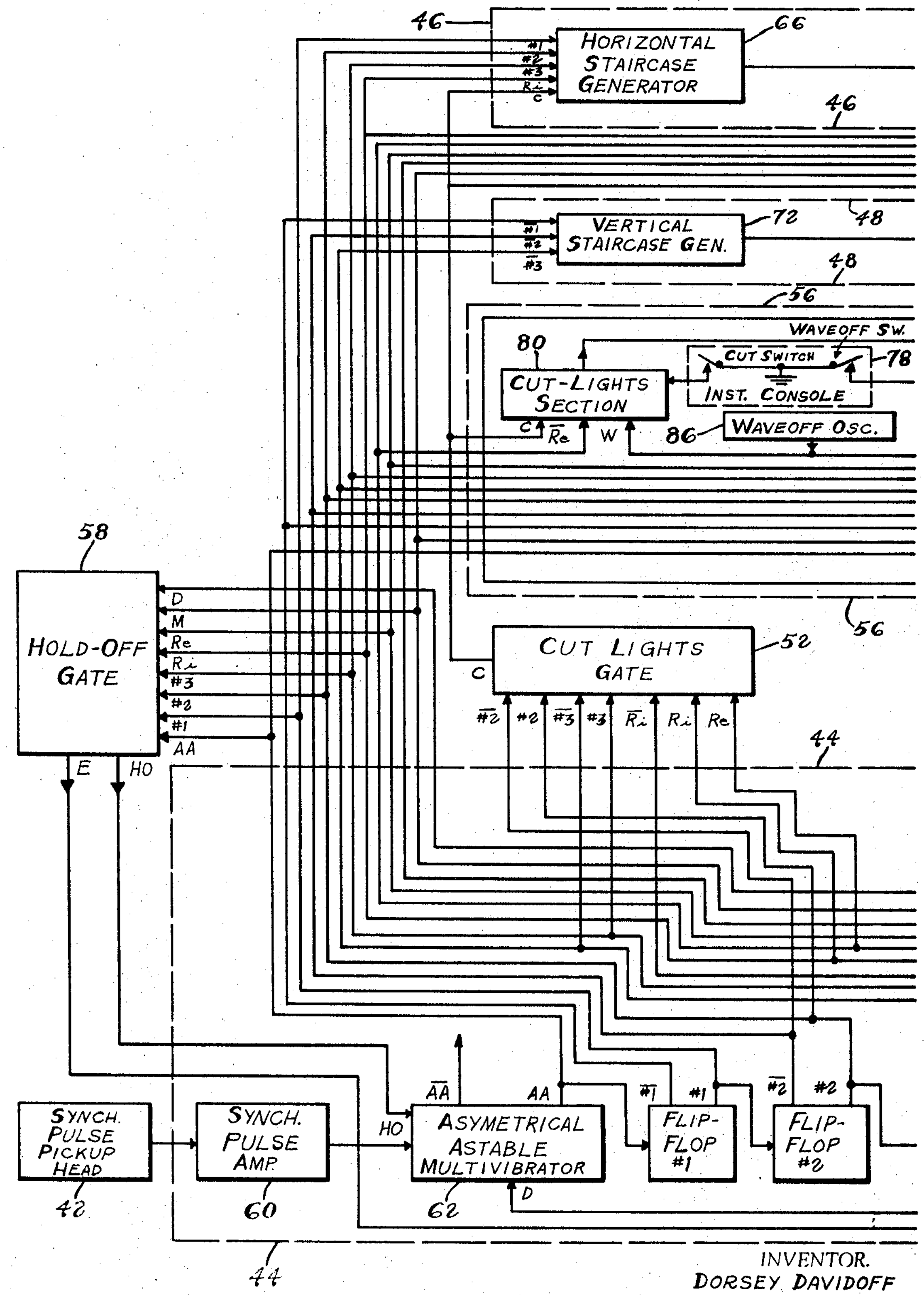
FIG. 3A is a functional schematic of the Fresnel synthesizer comprising the present invention.
Figure 3B:
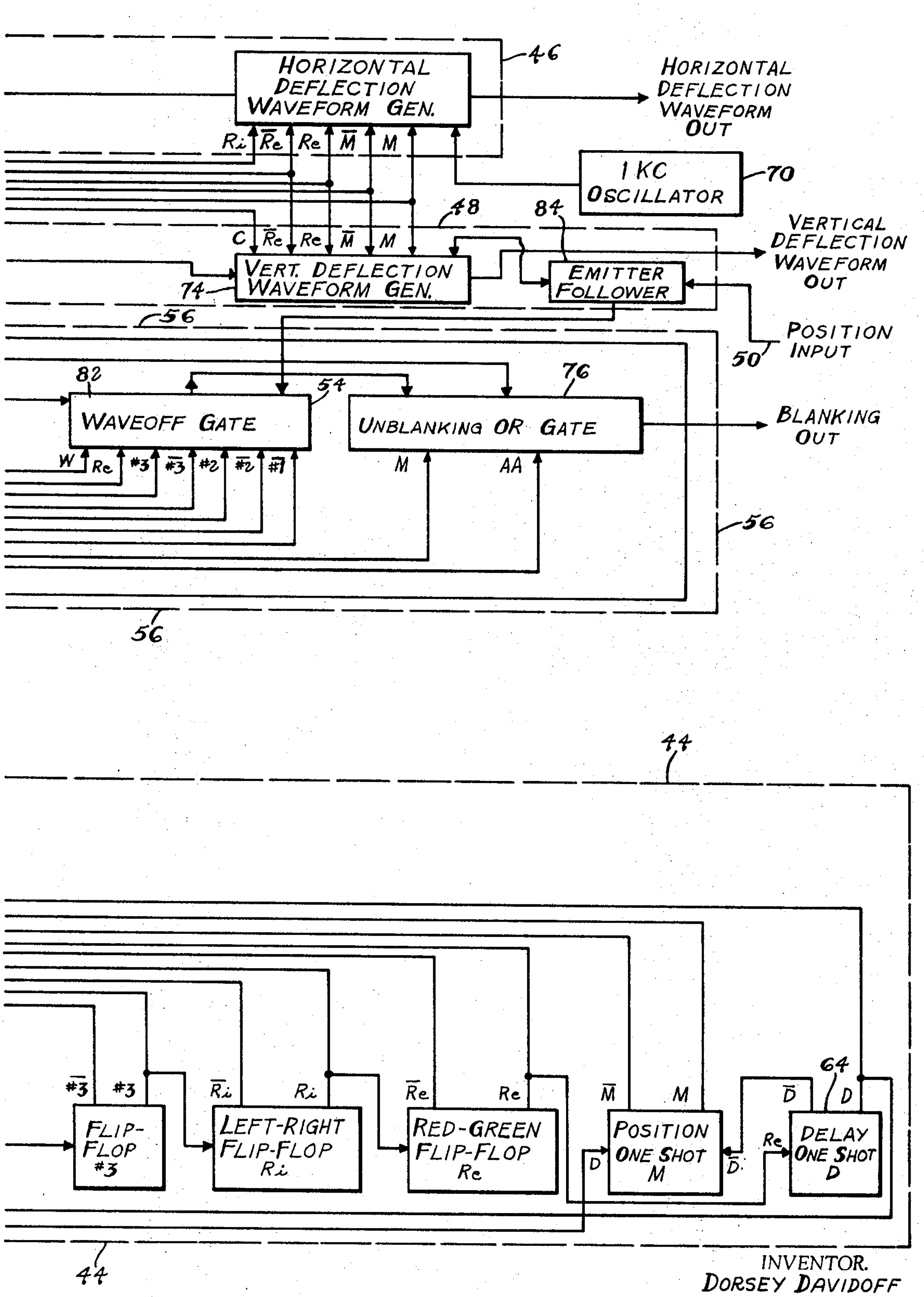
FIG. 3B is a continuation of FIG. 3A.

Turning now to FIGS. 3A and 3B a detailed schematic of the system disclosed in FIG. 2 is presented. When a pulse is picked up by a sync pulse pick-up head 42, FIG. 3A, it is passed through a synch pulse amplifier 60 and thereon to an asymmetrical astable multivibrator 62 which initiates a series of pulses causing the five stable binary counters to begin cycling. The five binary counter stages are designated as flip-flop 1, flip-flop 2, flip-flop 3, a left right flip-flop $R_1$ and red green flip-flop $R_e$. The next flip-flop to be sequentially fired after the red green flip-flop $R_e$ is delay one shot flip-flop 64. As described above, the effect of this delay means is to stop the asymmetrical multivibrator 62 for the delay period while simultaneously activating the one shot flip-flop M, thereby allowing the vertical deflection signal generator 48 to be in a position to receive a positioning input along line 50. The Fresnel horizontal lamp form is generated in horizontal deflection signal generator 46 which comprises a horizontal staircase generator 66, coupled to a horizontal deflection wave-form generator 68. Staircase generator 66 is responsive to the direct outputs of the first four stages of the binary counter and the output of the cut lights of the gate 52. The horizontal signals as developed are gated in horizontal deflection wave-form generator 68. Gating signals are received for this unit from the one red-green flip-flop $R_e$ and from the position one shot M. During the first 16 counting intervals, the red-green flip-flop output to the horizontal deflection unit generator 68 allows the staircase wave-form to pass to the output to produce the horizontal bar of green lights and the cut lights.

In the second 16 intervals the staircase voltage is cut-off. The 16th interval is the delay period in which no output is generated. The length of this period is adjusted so that at the start of the 17th interval the transition interval occurs, during the color wheel change from green to red, so that the result in this position is an amber color. During the 17th interval, the input from the one kilocycle oscillator 70 is gated through to give the amber center position light a width effect. In the 18 to 25 interval, the left hand column of red lights are generated. The right hand column is generated during the 26 through 30 intervals. During the 31st interval another amber center light is generated. At the end of this second amber center light the synthesizer remains in interval 31 and waits for the arrival of another start pulse.

The vertical deflection signal is generated in the vertical deflection signal generator 48 which comprises a vertical staircase generator 72 and a vertical deflection wave-form generator 74. The vertical staircase generator receives the inverse output signals from the first three stages of the binary counter 44. The function of this unit is to properly position the lights vertically.

The CRT 14 producing the Fresnel image is normally biased beyond cutoff. The beam is turned on by unblanking. Unblanking signals are obtained from four sources. Three of these sources are connected in "Or" logic fashion in unblanking "Or" gate 76. These sources are; the green unblanking gate signal, the position unblanking gate from the one shot M (counter 44), and the red unblanking gate signal. An output of any of these turns the beam on. The fourth signal comes from the astable multivibrator 62, and is introduced to the output of the "Or" gate in "AND" logic function configuration, and prevents the beam from going on during transmission from one interval to another regardless of the output of the other three gates.

The instruction console switching unit 78 allows the instructor to provide for signals representative of the cut lights or wave-off lights by manipulation of the proper switches. A cut light section 80 and wave-off gate section 82 is provided along with a wave-off oscillator 84 to properly generate signals representatives of these various lights. An emitter follower and cut-out circuit 84 is provided to receive the position input along line 50 and gate it to a first vertical deflection wave-form generator 74 to provide the proper biasing for the vertical deflection wave-form position and a second signal to the wave-off gate 82 to cut out the blanking signals during M while said position input is either too high or too low, which corresponds to an aircraft position from which the position light is not visible.

Figures 4, 5:
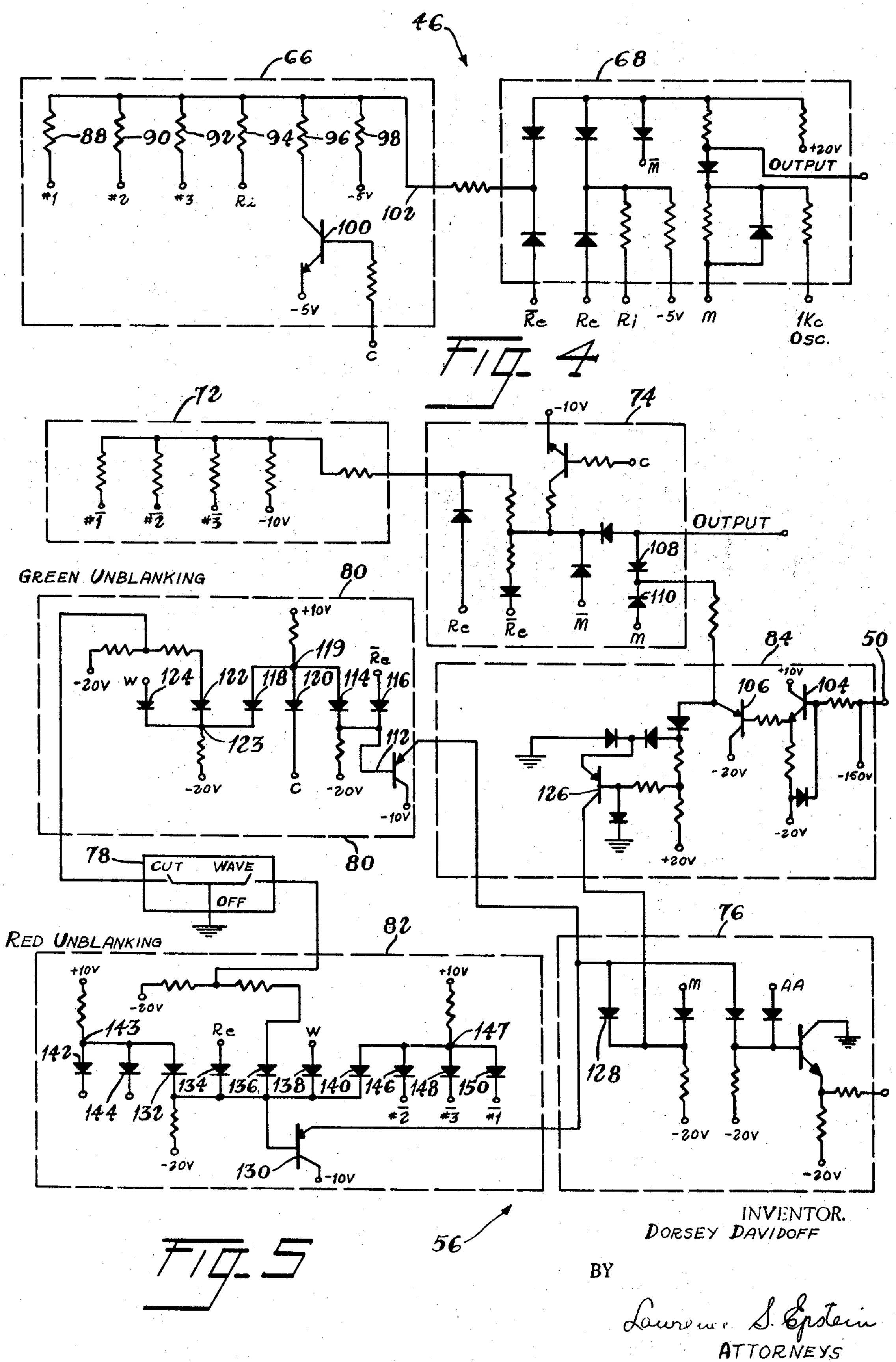
FIG. 4 is a detail of the Horizontal Deflection signal generator disclosed in FIG. 2.
FIG. 5 is a detail of the Vertical Deflection signal generator and the Blanking generator disclosed in FIG. 2.

Turning now to FIG. 4, the horizontal wave-form is generated is a staircase generator 66, consisting of a plurality of resistors 88, 90, 92, 94, 96 and 98. Resistor 98 is permanently connected to a minus 5 volt reference source. Resistor 96 is connected to the collector of transistor 100 and the other resistors go to the direct outputs of the first four counter stages. During the zero interval the voltage applied to the resistors are such that the summing junction 102 voltage is about —.5 volt. During the first 16 intervals the voltage at the junction becomes increasingly negative, and, after appropriate amplification and gating, generates the 6 outboard green lights, the four cut lights and the six inboard green lights. This represents a total of 16 different stages corresponding to the first 16 pulses produced by the counter and the 16 voltage levels representing each step of the staircase. The gating of the horizontal signals is accomplished in the horizontal deflection wave-form generator 68. Gating signals from this unit are received from the red-green flip-flop $R_e$ and from the position one shot M units in the counter 44.

Turning to FIG. 5, a detailed presentation of the vertical staircase generator 72 and the vertical deflection wave-form generator 74 is presented. The vertical deflection signal is generated in staircase manner just as described above in connection with the horizontal signal deflection generator. The vertical deflection waveform generator 74 has provision therein to receive a signal from the amber center light position emitter follower and cut-off circuit 84. The position signal is fed in on line 50, through emitter followers 104 and 106, and is gated to the vertical output by gating diodes 108 and 110, so that during the 17th and 31st interval the position one shot M will switch this position signal into the vertical wave-form. A blanking generator circuit which comprises units 80, 82 and 76 is also shown in schematic detail in FIG. 5. The green unblanking gate consists of all components connected to the base of transistor 112. This gate turns the beam on during the green interval when it should be on. Diodes 114 and 116 comprises an "AND" gate in which the input to the diode 116 permits the beam to be on only during the green field, if the other input is also minus 10 volts. The input applied to diode 114 is fed by an "Or" gate consisting of diodes 118 and 120. The input to diode 120 is the C gate signal generated by cut light gate 52. Since this is an "Or" gate this input turns all the green lights on except the cut lights regardless of the input to diode 118. If the cut light switch 78 is open, the green light will appear but no cut light will ever appear. If the cut light switch is closed, then the "AND" gate, consisting of diodes 122 and 124, comes into play. In this case the cut lights come on whenever the input voltage from the wave-off oscillator (W) is minus 10 volts. The position signal unblanking gate responsive to the cut-off section 126 of the position emitter follower and cut-off gate 84 serves to trigger diode 128 to turn the beam on and off during the position interval described above.

The red unblanking gate consists of transistor 130 (unit 84) and all components connected to its base. The base of transistor 130 is fed by a five input "AND" gate consisting of diodes 132 134, 136, 138 and 140. Diode 136 is fed by a ground potential through the wave-off switch gate 70. If this switch is closed, the "AND" gate is always off so that the beam is always off during the red field. If the switch is open, and the wave-off and direct $R_e$ inputs are at minus 10 volts, then the inputs to diodes 132 and 140 (the remaining two inputs) become effective and can turn the beam on by placing an unblanking potential upon the output of transistor 130. The inputs to diodes 132 and 140 are fed by a pair of "Or" gates the first of which consists of diodes 142 and 144 and a second of diodes 146, 148, and 150. The first "Or" gate is fed by direct outputs of flip-flops 2 and 3 of counter 44. The second is fed by the inverse outputs of the flip-flops 1, 2, and 3. The combination of these "Or" gates feeding an "AND" gate results in beam-on position in the 18th through 22nd interval and in the 26th through 30th interval. This combination with the direct output of the $R_e$ flip-flop, determines the ON positions in the red field. The net effect of the red unblanking gate 82 is to turn the beam on during the red wave-off lights if the wave-off switch is open (ON), at a two cycle per second rate governed by the wave-off oscillator.

Figure 6:
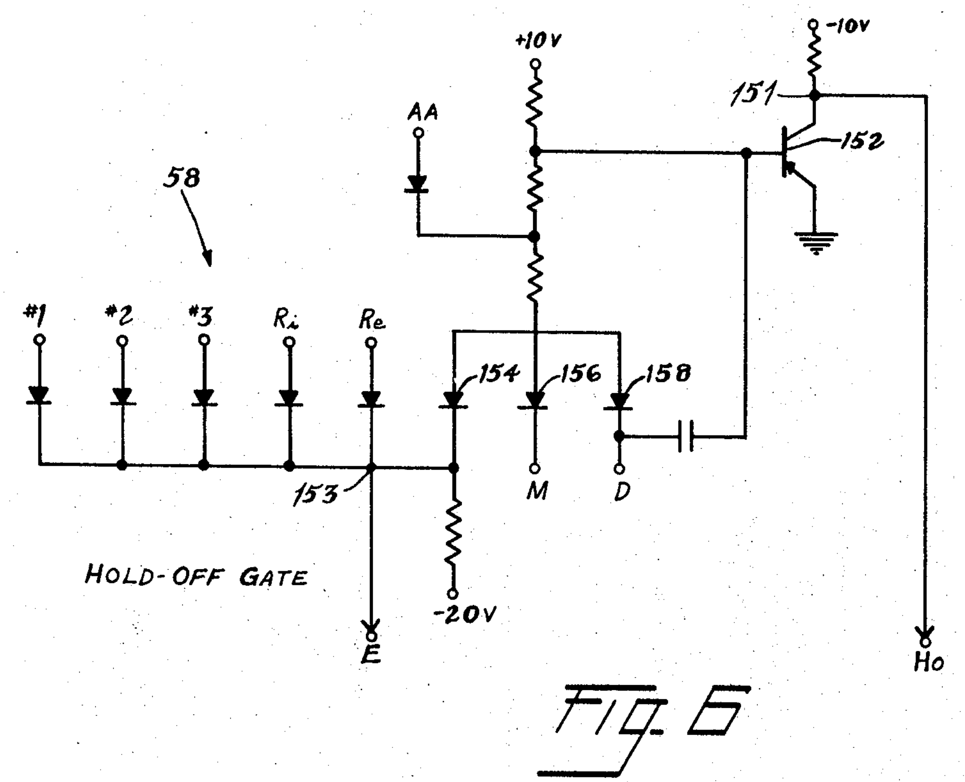
FIG. 6 is a detail of the Hold-Off gate disclosed in FIG. 2.

Turning now to FIG. 6, the hold-off gate is described in complete detail. Transistor 152 shorts the HO input of the astable multivibrator 62 to ground, thereby turning it off whenever the base of said transistor is negative with respect to ground. The base of transistor 152 is negative whenever any of three inputs to an "Or" gate consisting of diode 154, 156 and 158 are at minus 10 volts. Diode 154 is fed by an "AND" gate driven by the direct inputs from all five counter stages 1, 2, 3, $R_i$ and $R_e$. It is therefore goes negative only during the 31 interval, thereby stopping the astable multivibrator after the sequence is complete as described above. Diodes 156 and 158 are fed by the position one shot M and the delay one shot D thereby stopping the astable multivibrator 62 during the 16th and 17th intervals for three reasons described above. Finally, diode 158 serves to prevent the hold-off from operating during a retrace interval causing the astable always to stop in the same position.

Figure 7:
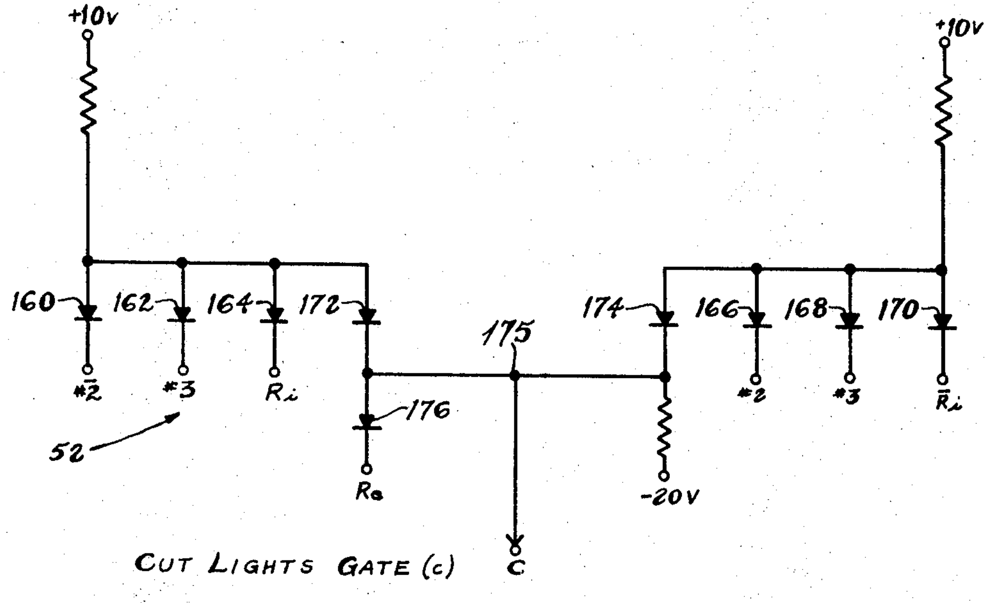
FIG. 7 is a detail of the cut light gate disclosed in FIG. 2.
Figure 8A:
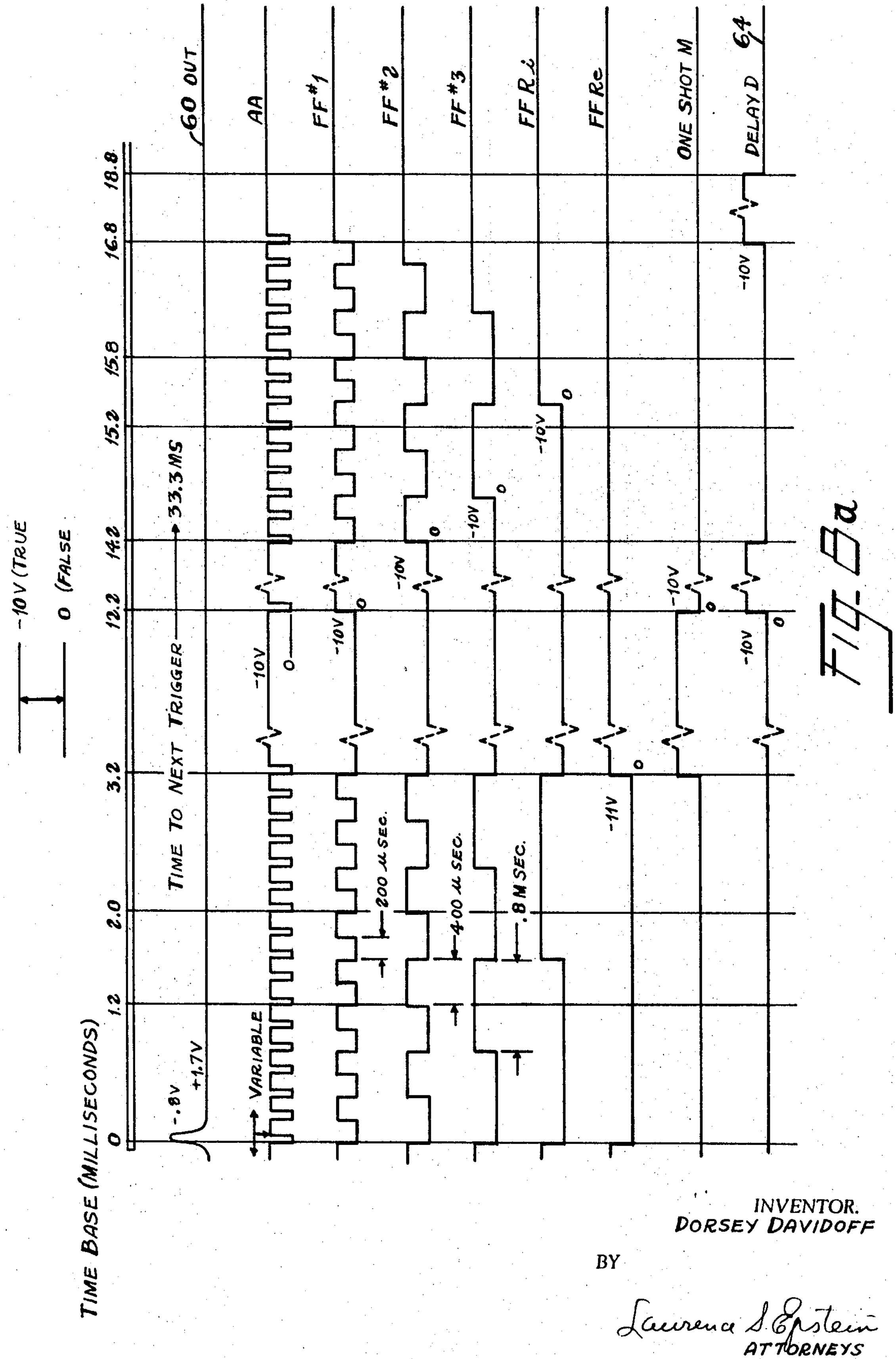
Figure 8:
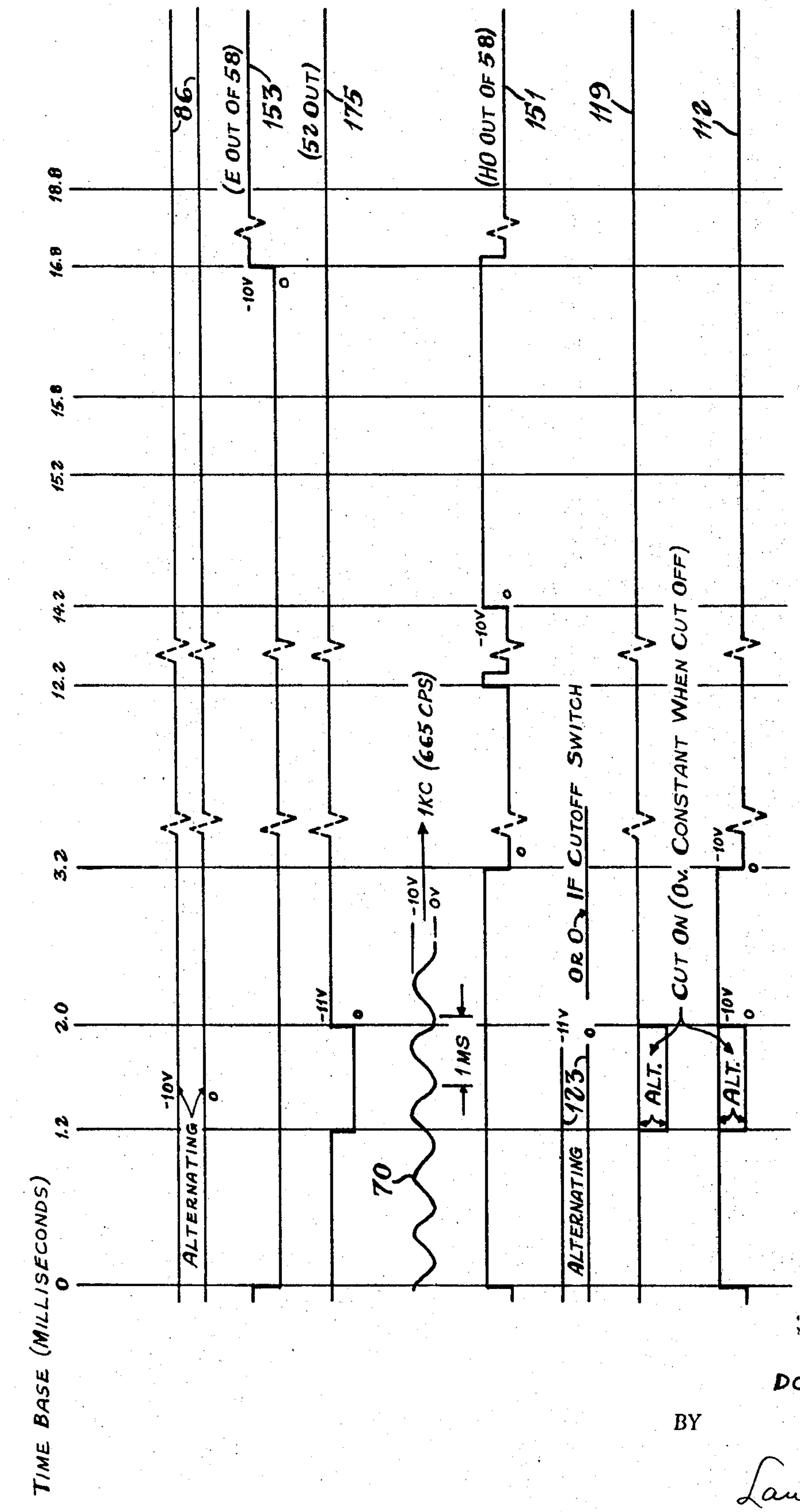
Figure 8C:
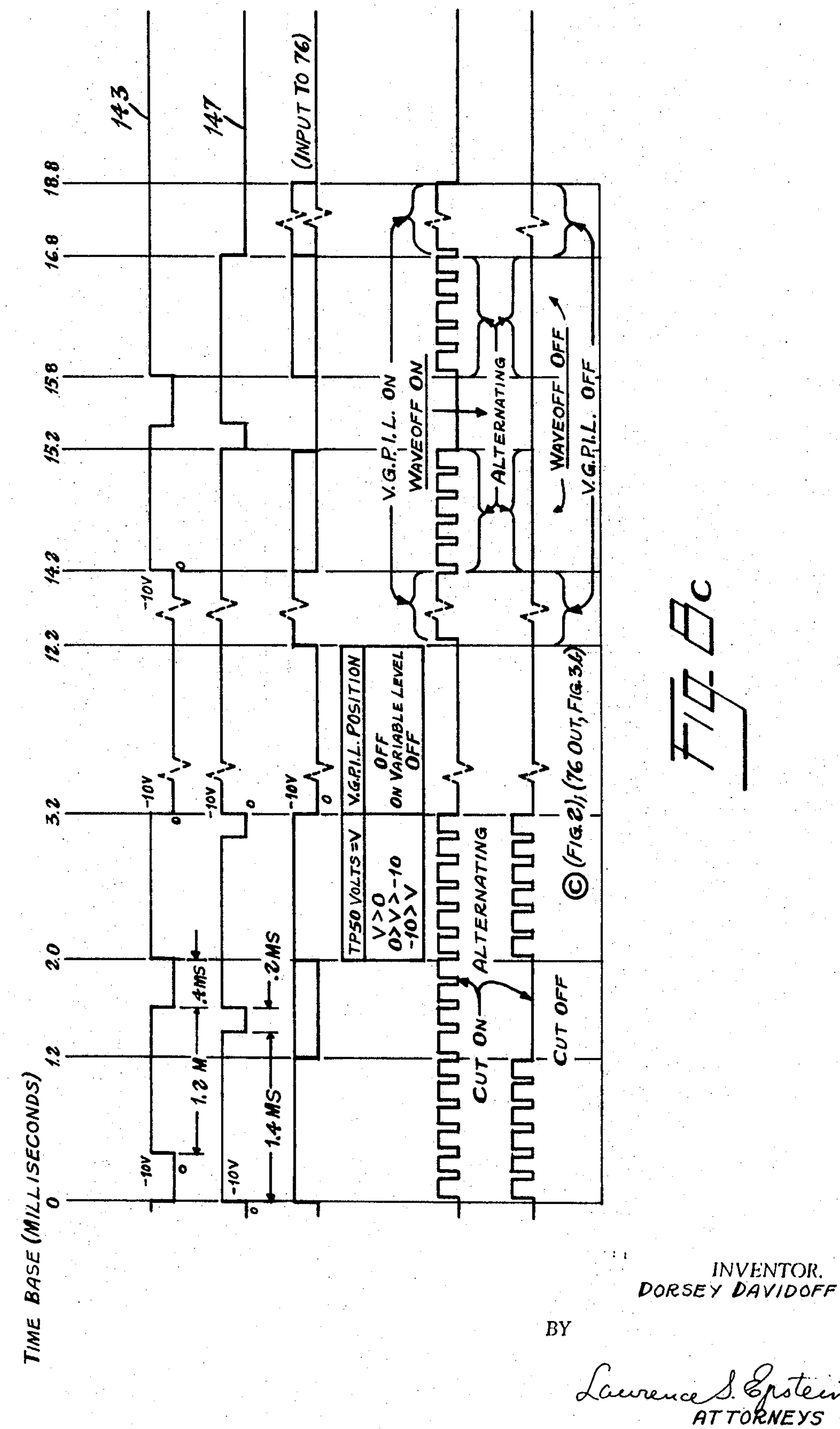
Figure 8D:
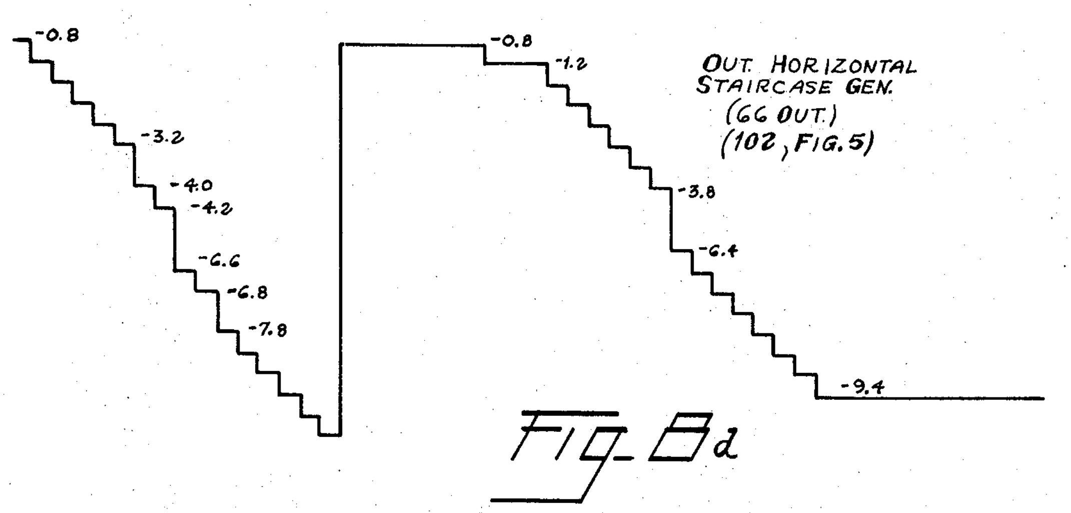
Figure 8E:
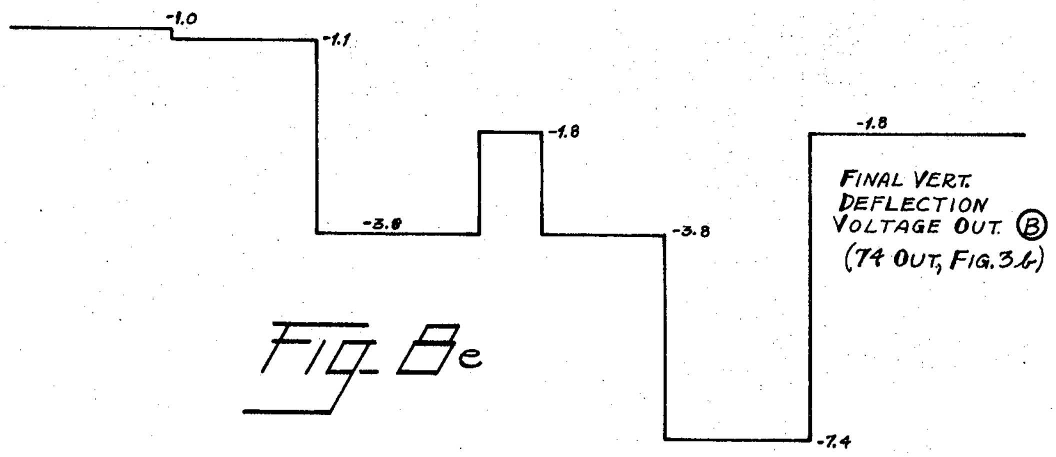
Figure 8F:
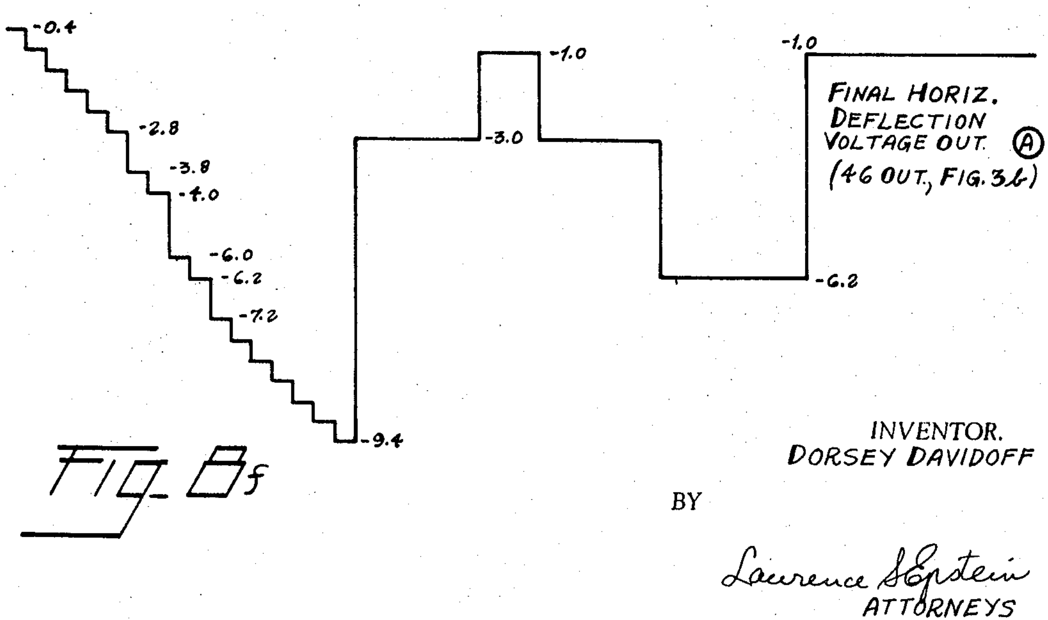

Turning now to FIG. 7, a complete detail of the cut light gate 52 is presented. This gate provides a minus 10 volts signal at all times except during a 6–9 interval when it provides a zero voltage signal. It is used in generating all three output voltages of the synthesizer. The cut light gate consists of two "Or" gates and an "AND" gate. The first "Or" gate consists of input diodes 160, 162 and 164. Its output is minus 10 volts at all times except during the 6th and 7th intervals. The second "Or" gate consists of diodes 166, 168 and 170. Its output is minus 10 volts at all times except during the 8th and 9th interval. The "AND" gate combined the outputs of the two "Or" gates, providing an output at all times except during the 6th and 9th interval. The "AND" gate consists of diode 172 and 174. An additional diode 168 is connected in an "Or" configuration and provides an output at all times in the red field.

Obviously many modifications and variations of the present invention are possible in the light of the above teachings. It is therefore to be understood that within the scope of the appended claims the invention may be practiced otherwise than as specifically described.

What is claimed is:

1. In a Fresnel image synthesizer system for generating a first series of lights representative of a datum line, a second series representative of wave-off lights, a third series representative of cut lights, and a fourth light whose vertical position is representative of guide path angle indication, the combination comprising:

a source of pulses, a first signal generator operatively coupled to said source of pulses, a second signal generator, operatively coupled to said source of pulses, a third signal generator, operatively coupled to said source of pulses, image display means, means operatively coupling each of said signal generators to said image display means, a cut lights gate, operatively coupled between said source of pulses and each of said signal generators, whereby the image displayed on said image display means will selectively be representative of a cut light signal, said third signal generator comprising a first gating means, having an input operatively coupled to said pulse source and said cut lights gate, a second gating means, having an input operatively coupled to said pulse source, a constant frequency source, means coupling said frequency source to the inputs of each of said gating means, a third gating means, operatively coupled to said pulse source, and means coupling the output of each of said first and second gating means to the input of said third gating means and comprising switching means, operatively coupled to said first gating means and said second gating means, whereby either one but not both of said gating means are selectively connected to said third gating means.

2. The combination defined in claim 1 and wherein:

said source of pulses comprises counter means and said pulses are programming pulses, said combination further comprising:

a rotatable color wheel operatively coupled to said image display means having a plurality of differently colored segments, means for rotating said wheel with respect to said image display means whereby images displayed are characterized by the colors of said segments, magnetic means mounted on said wheel for rotation therewith, magnetic detector means cooperable with said magnetic means to provide a start pulse as an output each time said wheel rotates through a predetermined position, means coupling the start pulse output of said detector means to said counter means, said counter means being responsive to each start pulse to initiate a new series of said programming pulses.

References Cited

UNITED STATES PATENTS

| | | | |
|---|---|---|---|
| 3,113,989 | 12/1963 | Gray et al. | 25—10.4 |
| 3,131,247 | 4/1964 | Benamy et al. | 35—10.4 |
| 3,165,024 | 1/1965 | McClure | 25—10.4 X |
| 3,293,348 | 12/1966 | Blackaddor et al. | 35—10.2 |
| 3,327,407 | 6/1967 | Barnes | 35—12 |

MALCOLM A. MORRISON, Primary Examiner

F. D. GRUBER, Assistant Examiner

U.S. Cl. X.R.

35—12; 178—6.8